J. W. R. ANDREWS.
TRANSMISSION MECHANISM.
APPLICATION FILED MAY 3, 1909.
935,882.
Patented Oct. 5, 1909.
2 SHEETS—SHEET 1.
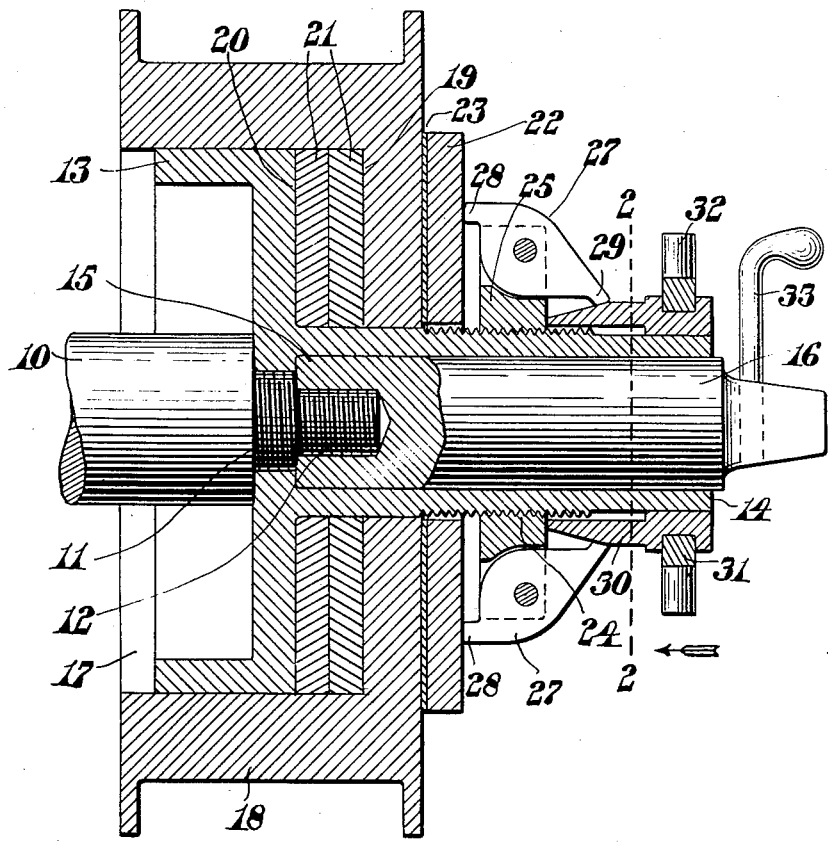
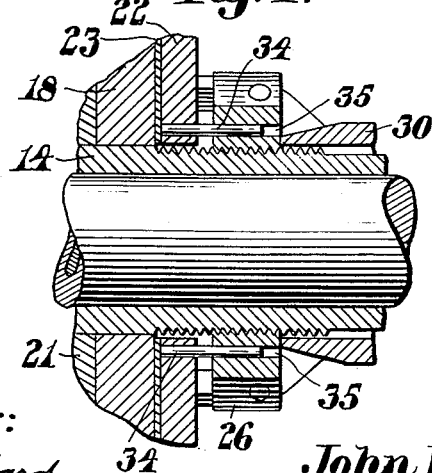
Witnesses:
Nathan C. Lombard
Howard Hanscom
Inventor:
John W. R. Andrews,
by Walter E. Lombard,
Atty.

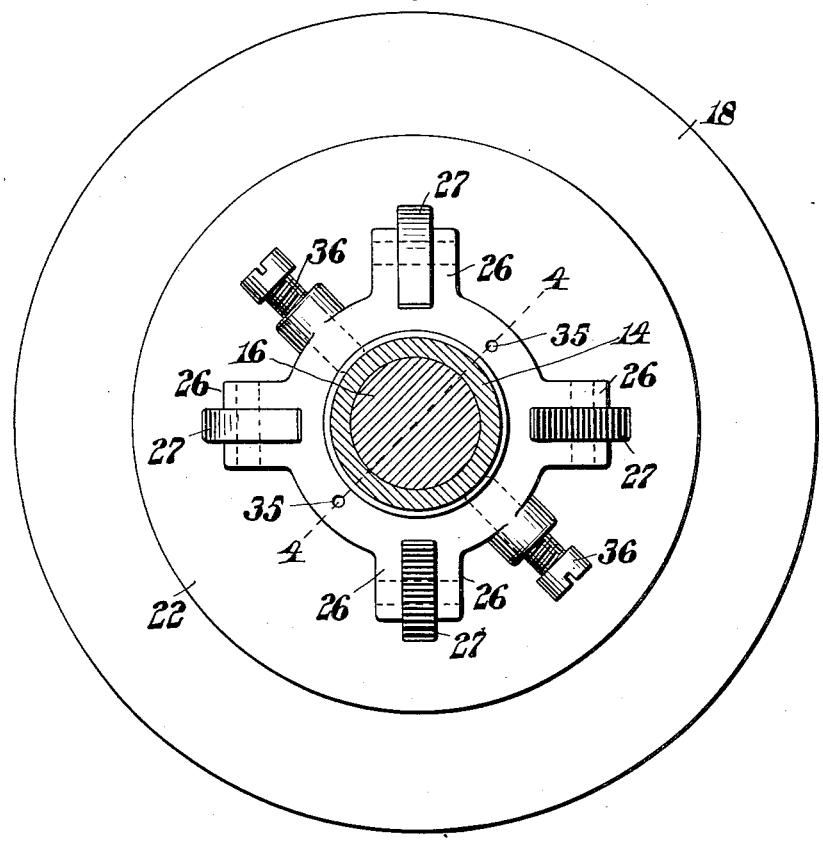
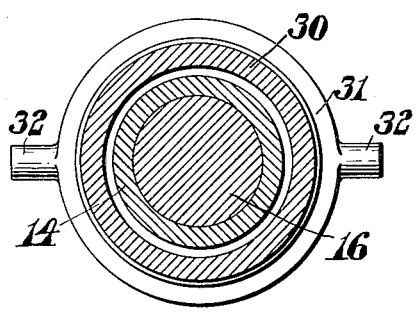

UNITED STATES PATENT OFFICE.

JOHN W. R. ANDREWS, OF LEOMINSTER, MASSACHUSETTS.

TRANSMISSION MECHANISM.

935,882.

Specification of Letters Patent. Patented Oct. 5, 1909.

Application filed May 3, 1909. Serial No. 493,746.

*To all whom it may concern:*

Be it known that I, JOHN W. R. ANDREWS, a citizen of the United States of America, and a resident of Leominster, in the county of Worcester and State of Massachusetts, have invented certain new and useful Improvements in Transmission Mechanisms, of which the following is a specification.

This invention relates to transmission mechanisms and has for its object the provision of a device of this kind which is especially adapted for use on motor cycles.

One of the objects of the invention is to secure to the end of the engine shaft all of the mechanisms for controlling its movement.

The invention consists in certain novel features of construction and arrangement of parts which will be readily understood by reference to the description of the drawings and to the claims hereinafter given.

Of the drawings: Figure 1 represents a section of a transmission mechanism embodying the features of the present invention. Fig. 2 represents a vertical section of the same, the cutting plane being on line 2—2 on Fig. 1, looking in the direction of the arrow. Fig. 3 represents a similar section of the same, the cutting plane being on line 2—2 on Fig. 1, looking in the direction opposite to that of the arrow, and Fig. 4 represents a section of a portion of the device, the cutting plane being on line 4—4 on Fig. 2.

Similar characters designate like parts throughout the drawings.

In the drawings, 10 represents the engine shaft, the end of which is provided with two reduced threaded ends 11 and 12. Screwed upon the reduced end 11 is the cylindrical member 13 provided with a tubular hub 14 extending beyond the end of the shaft 10 and in axial line therewith.

The interior diameter of the tubular member 14 is somewhat greater than the diameter of the reduced threaded extension 11, thus forming a shoulder 15 against which the end of the barrel nut 16 is adapted to contact to force the cylindrical member 14 into engagement with the end of the shaft 10 and securely lock it thereto so that it will revolve therewith.

The threaded socket of the barrel nut 16 engages with the reduced threaded extension 12 on the extreme outer end of the engine shaft 10. The cylindrical member 13 is positioned within a cylindrical chamber 17 within the loose pulley 18 freely revoluble about the hub 14. Interposed between the inner wall 19 of the pulley 18 and the outer face 20 of the annular member 13 are two plates 21 of fiber or some similar material adapted to frictionally engage with the pulley 18 and member 13 to cause them to rotate in unison when they are brought firmly into contact with each other.

Opposite the outer face of the pulley 18 is an annular plate 22 surrounding the hub 14 and having interposed between it and said pulley 18 a disk 23 of fiber or some other similar material. The hub 14 is threaded at 24 and on these threads 24 is adjustably mounted a ring 25 provided with suitable ears 26 between each pair of which is pivoted a dog 27.

Each dog 27 is provided with two projections 28 and 29 the projections 28 of which bear against the outer face of the annular plate 22 while the projection 29 is adapted to be engaged by the cone wedge 30 slidably mounted upon the tubular hub 14 and having mounted in an annular groove therein a ring 31 provided with trunnions 32 which are adapted to be engaged by any suitable lever (not shown) to slide the member 30 lengthwise of said hub 14 when desired.

It is obvious that when the cone wedge is moved toward the pulley 18 the tapered walls of the cone wedge 30 will cause a movement of the dogs 27 about their pivots in the ring 25, thus through the medium of the projections 28 on said dogs 27, forcing the plate 22—23, pulley 18, plates 21, and cylindrical member 13 into close contact with one another so that all of these parts rotate in unison so that the rotation of the engine shaft 10 will be transmitted through these mediums to the pulley 18.

A belt (not shown) on the pulley 18 is adapted to transmit this power to any desired point, as, for instance, to the driving wheel of the motor cycle. The outer end of the barrel nut 16 is provided with a radiating arm 33 which serves as a stop to limit the outward movement of the cylindrical cone wedge 30 while at the same time it serves as a means for cranking the engine when this is necessary.

The annular plate 22 is provided with a plurality of pins 34 projecting therefrom into openings 35 in the tube 25, thus causing these members to rotate together.

It is obvious that whenever the projections 28—29 of the dogs become worn or the plates 21—23 became worn the ring 24 may be adjusted longitudinally of the tubular hub 14 to take up this wear and it is also obvious that this same adjustment can be made when desired to secure a greater or lesser clamping action between these various contacting members. The ring is held in adjusted position by means of the set screws 36. This provides a very compact transmission mechanism secured to the end of the engine shaft whereby the power derived from the engine may be transmitted to other points at the will of the operator.

It is believed that the operation and many advantages of the invention will be fully understood from the foregoing.

Having thus described my invention, I claim:

1. In a device of the class described, the combination with an engine shaft; a cylindrical member secured thereto and revoluble therewith and provided with a cylindrical hub in axial line with said shaft; a loose pulley on said hub provided with a chamber adapted to receive said cylindrical member; friction plates surrounding said hub and interposed between the opposing faces of said cylindrical member and pulley; a ring adjustable lengthwise of said hub; a plurality of dogs pivoted thereto; an annular plate interposed between said dogs and pulley; pins projecting from said annular plate into holes in said ring for insuring the rotation of said ring and annular plate in unison; and slidable means on said hub adapted to act on said dogs to force said pulley, plates, and member into contact to cause them to rotate in unison.

2. In a device of the class described, the combination with an engine shaft having at one end two threaded reduced extensions; of a cylindrical member threaded to one of said reduced extensions and having a tubular hub the interior diameter of which exceeds the diameter of said extension to which said member is threaded; a barrel nut fitting the bore of said tubular members and threaded to the outer threaded extension of said shaft; a loose pulley on said hub having a chamber to receive said cylindrical member; friction plates between said member and the inner face of said chambered pulley; an adjustable ring on said hub; a plurality of dogs pivoted thereto; and a conical wedge slidable on said hub to engage said dogs and force said pulley, plates, and member into contact to cause them to rotate in unison.

3. In a device of the class described, the combination with an engine shaft having at one end two threaded reduced extensions; of a cylindrical member threaded to one of said reduced extensions and having a tubular hub the interior diameter of which exceeds the diameter of said extension to which said member is threaded; a barrel nut fitting the bore of said tubular members and threaded to the outer threaded extension of said shaft; a loose pulley on said hub having a chamber to receive said cylindrical member; friction plates between said member and the inner face of said chambered pulley; an adjustable ring on said hub; a plurality of dogs pivoted thereto; a conical wedge slidable on said hub to engage said dogs and force said pulley, plates, and member into contact to cause them to rotate in unison; and means on said barrel nut to limit the outward movement of said cone wedge.

4. In a device of the class described, the combination with an engine shaft having at one end two threaded reduced extensions; of a cylindrical member threaded to one of said reduced extensions and having a tubular hub the interior diameter of which exceeds the diameter of said extension to which said member is threaded; a barrel nut fitting the bore of said tubular members and threaded to the outer threaded extension of said shaft; a loose pulley on said hub having a chamber to receive said cylindrical member; friction plates between said member and the inner face of said chambered pulley; an adjustable ring on said hub; a plurality of dogs pivoted thereto; a conical wedge slidable on said hub to engage said dogs and force said pulley, plates, and member into contact to cause them to rotate in unison; and an arm on said barrel nut adapted to limit the outward movement of said cone wedge and provide a means for cranking the engine.

Signed by me at 4 Post Office Sq., Boston, Mass., this 30th day of April, 1909.

JOHN W. R. ANDREWS.

Witnesses:
WALTER E. LOMBARD,
EDNA C. CLEVELAND.